United States Patent
Wesemann et al.

(10) Patent No.: US 12,386,608 B2
(45) Date of Patent: *Aug. 12, 2025

(54) BOOT AND UPDATE FROM RUNTIME MERGED IMAGE FRAGMENTS

(71) Applicant: MICROSOFT TECHNOLOGY LICENSING, LLC, Redmond, WA (US)

(72) Inventors: Matthaus Alden Wesemann, Redmond, WA (US); Hakki Tunc Bostanci, Redmond, WA (US); Aaron Farmer, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/526,917

(22) Filed: Dec. 1, 2023

(65) Prior Publication Data

US 2024/0211247 A1    Jun. 27, 2024

Related U.S. Application Data

(63) Continuation of application No. 17/527,067, filed on Nov. 15, 2021, now Pat. No. 11,886,868.

(51) Int. Cl.
  *G06F 8/656* (2018.01)
  *G06F 8/65* (2018.01)
  *G06F 9/4401* (2018.01)
  *H04L 67/00* (2022.01)

(52) U.S. Cl.
  CPC .......... *G06F 8/656* (2018.02); *G06F 8/66* (2013.01); *G06F 9/4408* (2013.01); *H04L 67/34* (2013.01)

(58) Field of Classification Search
  CPC .......... G06F 8/656; G06F 8/66; G06F 9/4408; H04L 67/34
  USPC ................................................. 717/168–178
  See application file for complete search history.

(56) References Cited

U.S. PATENT DOCUMENTS

| | | | |
|---|---|---|---|
| 5,732,275 A * | 3/1998 | Kullick | G06F 8/656 713/1 |
| 10,175,970 B2 * | 1/2019 | Li | G06F 9/445 |
| 10,863,239 B2 * | 12/2020 | Anderson | H04N 21/4586 |
| 10,936,296 B2 * | 3/2021 | Mitra | G06F 8/65 |
| 2001/0014968 A1 * | 8/2001 | Mohammed | G06F 8/65 717/170 |

(Continued)

OTHER PUBLICATIONS

Kubiatowicz, John, et al. "Oceanstore: An architecture for global-scale persistent storage." ACM SIGOPS Operating Systems Review 34.5 (2000): pp. 190-201. (Year: 2000).*

(Continued)

*Primary Examiner* — Satish Rampuria
(74) *Attorney, Agent, or Firm* — Han Gim; Newport IP, LLC

(57) ABSTRACT

A feature is updated on a computing device. One or more composite image files are accessed that correspond to updates to be implemented in the computing device. The composite image files are signed containers. A runtime in-memory merge of the composite image files is performed. The merged composite image files are exposed as a read-only volume. The features are made available to the computing device. A system boot using the read-only volume can be initiated.

20 Claims, 7 Drawing Sheets

(56) References Cited

U.S. PATENT DOCUMENTS

2019/0069027 A1* 2/2019 Anderson .......... H04N 21/4349

OTHER PUBLICATIONS

Kreutz, Diego, Fernando MV Ramos, and Paulo Verissimo. "Towards secure and dependable software-defined networks." Proceedings of the second ACM SIGCOMM workshop on Hot topics in software defined networking. 2013. pp. 50-60 (Year: 2013).*

Wetherall, David J., John V. Guttag, and David L. Tennenhouse. "ANTS: A toolkit for building and dynamically deploying network protocols." 1998 IEEE Open Architectures and Network Programming. IEEE, 1998.pp. 117-129. (Year: 1998).*

Linden, Theodore A. "Operating system structures to support security and reliable software." ACM Computing Surveys (CSUR) 8.4 (1976): pp. 409-455. (Year: 1976).*

Neamtiu, Iulian, et al. "Practival dynamic software updating for C." ACM SIGPLAN Notices 41.6 (2006): 72-83. (Year: 2006).*

Chen, Daming D., et al. "Towards automated dynamic analysis for linux-based embedded firmware." NDSS. vol. 1. 2016. pp. 1-16 (Year: 2016).*

* cited by examiner

BOOT AND UPDATE FROM RUNTIME MERGED IMAGE FRAGMENTS

CROSS-REFERENCE TO RELATED APPLICATION

This application is a continuation of U.S. patent application Ser. No. 17/527,067, filed Nov. 15, 2021, the content of which application is hereby expressly incorporated herein by reference in its entirety.

BACKGROUND

In computing systems, operating systems, applications, and other software are frequently updated to provide improved features, fix bugs, and improve the security of a computing device by protecting against new malware threats. Software updates may be installed by running update programs from media such as a CD-ROM. Updates can also be downloaded via the Internet. Many applications include an automatic update feature that checks for updated versions and downloads/installs the updates, typically with user permissions.

Operating systems may also have an update feature that will download and install new versions and patches to the operating system. In a typical update, various files and data may be downloaded, and the process may involve additional files and data being downloaded as the update process continues. Once the update is completed and the updates are installed, the updated software may be loaded for execution, and the files and data that were used for the update may be deleted.

It is with respect to these and other considerations that the disclosure made herein is presented.

SUMMARY

Systems and methods are described that enable a computing device to maintain and update applications and data, such an operating system (OS), while improving the operation and efficiency of the mechanisms for doing so. Such systems and methods may be implemented, for example, in systems that use operating systems such as Windows. In an embodiment, operating system images may be composed using pre-packaged image fragments that contain a portion of the total file and registry payload for an image. There may be a plurality of available fragments that an image can select to include in the image. During boot, these fragments may be merged together and exposed as a virtual volume/registry and may be largely invisible to runtime code, thus allowing for a quick and dynamic combination to create a clean, read-only OS image.

The disclosed embodiments allow for the complex processing of system updates to be moved off the device, for example by having the fragments built and signed in a build lab. Since the fragments are built and signed in the build lab, the disclosed embodiments provide improved security compared to current operating system update methods. The file system metadata and registry hives may also be verified during boot. The disclosed embodiments can enable faster operating system updates as well as improvements in I/O speed due to the format for the image fragments.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter or a sequence of letters to refer to each individual item. Generic references to the items may use the specific reference number without the sequence of letters.

DETAILED DESCRIPTION

Figure 1A:
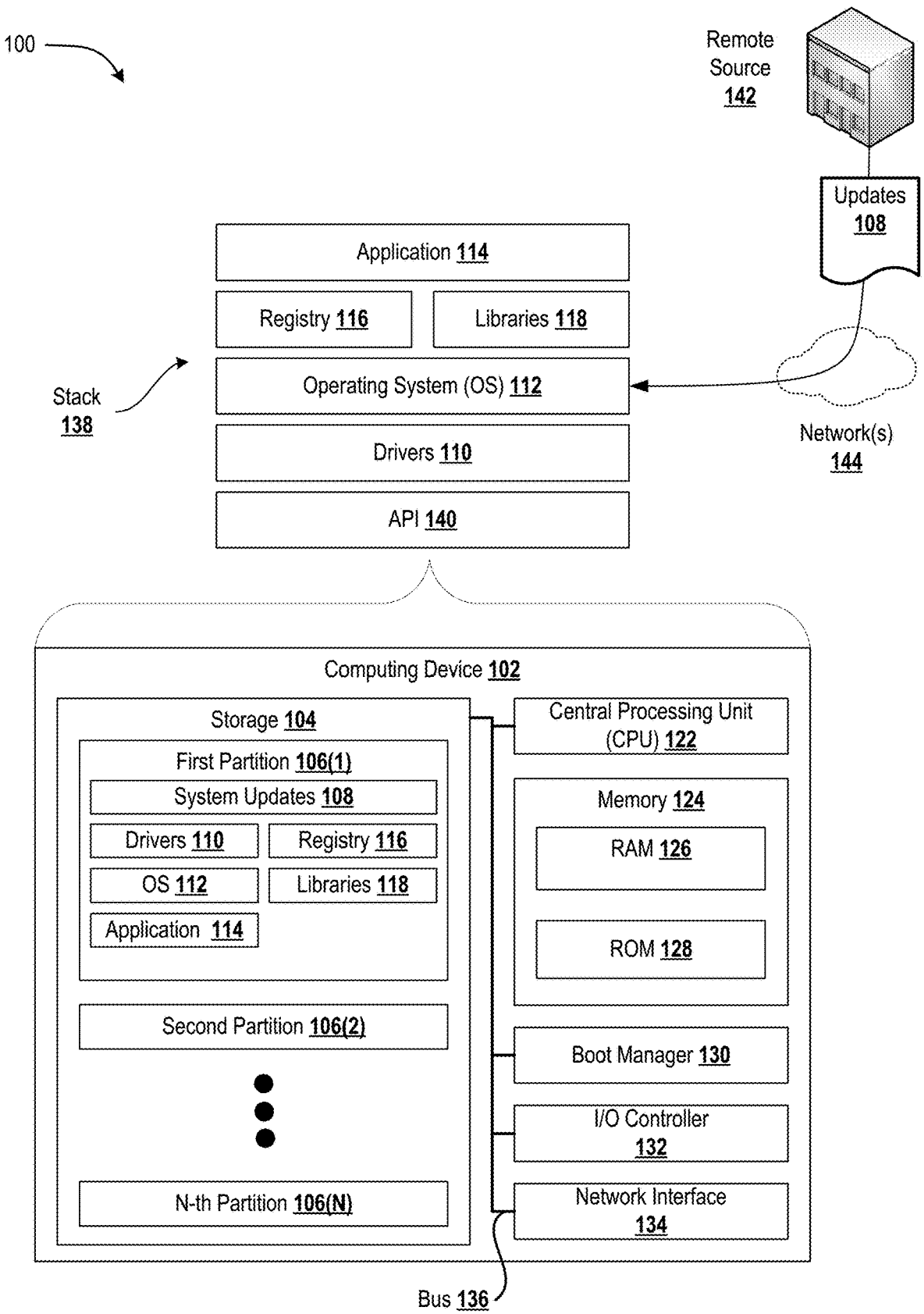
FIG. 1A an example computer architecture for a computer capable of implementing a system update as described herein.

The frequency of system updates, such as operating system updates, is increasing as system providers continue to push out feature upgrades as well as address security threats. Today, operating systems may run many loose files on disk and keys/values in the registry. These files and registry states may, for example, be defined by thousands of components, e.g., XML manifests, grouped into hundreds of packages. Thus when a new OS image is desired, or the OS composition is to be modified, or the OS is to be updated, the servicing stack must perform complex and costly processing in order to translate manifests into raw file and registry operations. For any given update, the servicing stack typically handles such operations, resulting in a significant amount of processing which can introduce errors, consume power, and is susceptible to corruption. It would be beneficial in terms of speed, efficiency, and security if the update methodology was converged to a single update model. Users may also benefit in that consolidating testing resources can provide a more reliable update process. Additionally, when systems and applications are updated such as an operating system update, when the update fails, it is desirable to return the operating system to a known clean state. The known clean state may refer generally to a user mode operational state that is configured to support a specific operational scenario. However, it may be difficult to return to such a state, as some portion of the updates may remain in the reverted operating system. In many cases, it may not be possible to remove all updates that were added to the operating system, thereby making it difficult or impossible to completely achieve a clean separation between the previous and new operating system.

While some closed systems may provide a high degree of control and security by using a single signed container and allowing for all block reads to be signed and verified, it is difficult to provide flexibility and customization with such a model. Furthermore, using a single static image does not support customizable options. System providers may want to select specific features, provide features on demand, language packs, and the like. The present disclosure allows for read only states that can be provided via pre-generated packages for a given build, which may be referred to as image fragments. In an embodiment, an image fragment may be created by front-loading the associated complex processing on a per-package basis in the build lab and capturing the result in a single archive file. Image fragments are not expanded or applied to disk. Rather, a set of image fragments may be logically merged at runtime into a combined view of a complete OS image. This process is similar to mounting a virtual disk but combines several archives into a single namespace. This merge process can be performed very quickly since the costly processing required to convert packages/components into a file system and registry primitives has already been completed.

In an embodiment, image fragments may be immutable, and a mechanism may be provided to capture file system modifications on the target system. In one example, a mechanism may capture modifications made to a read-only OS image and save the modifications in a separate and persistent read-write layer. Such a mechanism may provide a form of state separation, but does not require OS components, applications, or drivers to be made state separation aware. In one embodiment the modifications (e.g., adds, modifications, deletes) can be captured in a system overlay that includes a read-only underlay and a read-write overlay where the modifications are captured. The underlay and overlay may be combined to present a complete OS image to the system.

Implementation of the disclosed embodiments allow for adding, removing, or updating packages in the OS as a fast, efficient configuration change, modifying the list of image fragments contributing to an image. In an embodiment, composable file system functionality may be implemented that can be used to efficiently construct the desired namespace. The OS may be laid out in a folder on a drive as a collection of image fragment composable images (CIMs). One or more of these image fragment CIMs can be merged at boot time to construct a merged CIM that describes the desired image. In some embodiments, the image fragment CIMs may be merged at runtime.

In one embodiment, during an upgrade event, a new volume may be manifested with the updated packages stored as CIMs. The servicing stack may then configure the boot configuration entries to merge the new CIMs with the original base CIM if this is a hotfix, or set up a new merged CIM if this is a full feature update. On the next reboot, the new merged CIM may be generated, and the system may boot from the new merged CIM.

In the description that follows, embodiments are described with reference to operations that are performed by one or more computing systems. If such operations are implemented in software, one or more processors of the associated computing system that performs the operations may direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory of the computing system.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In a computing environment, a volume system may use a volume exposure system to expose a volume to a file system. The computing environment may be, for example, implemented in the computing system.

The volume may include storage represented in the form of contiguous logical addresses. In this description and in the claims, a "volume" is defined as any group of one or more logical address extents that is presented to a file system in the form of a single namespace. When the file system issues a read or write request to the volume system, the file system request may include a logical address. The volume system is configured to recognize the part of the volume that is being addressed using the logical address provided by the file system. Thus, from the file system point of view, the file system has access to the entire volume logically addressable throughout the entire extent of the volume.

Because not all storage locations in the volume have the same sets of features or characteristics, the volume may be viewed as a heterogenic volume, being composed of portions that have different sets of features or characteristics. A mapping system may map each of at least some of the logical storage locations of the volume to a corresponding physical storage location in underlying storage systems.

The term "physical" storage location or "physical" address may reference a storage location or address, respectively, in the underlying storage systems, thus distinguishing the addressing scheme (i.e., "logical addressing scheme") used by the file system when addressing the heterogenic volume from the addressing scheme (i.e., "physical addressing scheme") used by the underlying storage system to access storage offered by the corresponding underlying storage system. For instance, the file system may use "logical" addresses to address the storage within the volume. However, the storage systems may use "physical" addresses to access the respective storage locations.

In some embodiments, there may be one or more further levels of mapping abstraction that separate even the underlying storage system from the actual physical storage medium. For example, the underlying storage system might be physical storage systems such as flash memory, solid-state disks, mechanical disks and so forth. However, the storage system might also comprise some type of consolidated storage system that offers up addresses that are mapped to further underlying storage systems. Furthermore, there may be one or more transformations (such as encryption or compression) that the storage system applies to the data prior to storing to a given storage location, and one or more reverse transformations (such as decryption or decompression) that the storage system applies to the data after reading data from the given storage location.

In some embodiments, granularity of storage locations may be represented by a basic unit that the mapping system works with in order to map storage locations. Each unit may represent contiguous address locations (e.g., contiguous logical blocks) in the logical addressing scheme recognized by the file system. In order to simplify the mapping, each unit may also represent contiguous address locations in the physical addressing scheme.

Smaller units may have the advantage of having more fine-grained control over the boundaries between storage of different sets of features or characteristics in the volume, but have the disadvantage of increasing the number of mappings that the mapping system keeps track of.

The file system may include metadata about the volume such as the size of the volume, and the size and logical storage location(s) of each of the classes. The metadata might also include the sets of features or characteristics of each of the classes. The metadata may, for example, be persisted. The file system may use this metadata to make decisions regarding where to place a file system namespace (such as a directory or file), or a portion thereof, into the volume. There may be different types of metadata, e.g. system metadata and user metadata. System metadata refers to information kept by the file system to facilitate basic operations, including data allocation, ensuring system integrity, etc. User metadata refers to metadata that tracks file names, directory structures, and other user generated information Turning now to FIG. 1A, illustrated is an example computing architecture 100 that receives updates 108 on a computing device 102. For example, updates may be received to update one or more system components. Example system components include, but are not limited to, drivers 110, an operating system (OS) 112, an application 114, a registry 116, and/or libraries 118.

As illustrated in FIG. 1A, the computing device 102 may include one or more drive(s) 104 (hereinafter referred to as the "drive") having computer-readable media that provides nonvolatile storage for the computing device 102. Example drives include, but are not limited to, SATA-type solid-state hard drives, SATA-type hard disks, PATA-type solid-state hard drives, PATA-type hard disks, and/or any other drive-type suitable for providing non-volatile computer-readable media to a computing device. The storage 104 may include partitions 106 for logically separating one or more system components and/or data objects. In the illustrated example, the storage 104 is separated into a first partition 106(1), a second partition 106(2), and an N-th partition 106(N). In some embodiments, at least one of the partitions 106 stores drivers 110 and an operating system (OS) 112 to enable a boot manager 130 to initiate the drivers 110 and to load the OS 112 into a memory 124. In the illustrated example, the memory 124 includes a random-access memory ("RAM") 126 and a read-only memory ("ROM") 128. As further illustrated, the computing device 102 includes a central processing unit ("CPU") 122 that is connected, via a bus 136, to the storage 104, the memory 124, and the boot manager 130. In some embodiments, the bus 136 further connects an input/output (I/O) controller 132 and/or a network interface 134.

It can be appreciated that the system components described herein (e.g., the drivers 110, the OS 112, and/or the application 114) may, when loaded into the CPU 122 and executed, transform the CPU 122 and the overall computing device 102 from a general-purpose computing system into a special-purpose computing system customized to facilitate the functionality presented herein. The CPU 122 may be constructed from any number of transistors or other discrete circuit elements, which may individually or collectively assume any number of states. More specifically, the CPU 122 may operate as a finite-state machine, in response to executable instructions contained within the software modules disclosed herein. These computer-executable instructions may transform the CPU 122 by specifying how the CPU 122 transitions between states, thereby transforming the transistors or other discrete hardware elements constituting the CPU 122.

The storage 104 and associated computer-readable media provide non-volatile storage for the computing device 102. Although the description of computer-readable media contained herein refers to one or more storage devices, such as a solid-state drive and/or a hard disk, it should be appreciated by those skilled in the art that computer-readable media can be any available computer storage media or communication media that can be accessed by a computing architecture such as, for example, the computing architecture 100. Communication media includes computer-readable instructions, data structures, program modules, and/or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above are also included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, SSD, SCM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing device 102. For purposes of the claims, the phrase "computer storage medium," "computer-readable storage medium," and variations thereof, does not include waves, signals, and/or other transitory and/or intangible communication media, per se.

The boot manager 130 may access the OS 112 from the storage 104 (or a partition thereof) and may load the OS 112 into the memory 124 for runtime execution by the computing device 102 (e.g., by invoking an OS boot loader). The I/O controller 132 may receive and process input from a number of other devices, including a keyboard, mouse, or electronic stylus (not shown in FIG. 1). Similarly, the I/O controller 132 may provide output to a display screen, a printer, or other type of output device (also not shown in FIG. 1). The network interface 134 may enable the computing device 102 to connect to one or more network(s) 144 such as a local area network (LAN), a wide area network (WAN), a wireless local area network (WLAN), or any other suitable network for passing information between the computing device 102 and a remote resource 142.

As described above, the storage 104 may include multiple partitions 106 for logically separating one or more system components and/or data objects. In the illustrated example, the storage 104 includes the first partition 106(1) which stores instances of the drivers 110, the OS 112, the application 114, the registry 116, and the libraries 118. The drivers 110 may include one or more programs for controlling one or more devices that are communicatively coupled to the computing device 102 such as, for example, printers, displays, cameras, soundcards, network cards, computer storage devices, etc. The OS 112 may be any suitable system software for managing computer hardware and/or software resources and for providing services to the application 114 and/or other applications (not shown). An example OS 112 may include, but is not limited to, various versions of MICROSOFT WINDOWS (e.g., WINDOWS 8.1 or 10, WINDOWS EMBEDDED STANDARD 7, etc.), Mac OS X, iOS, etc.

The application 114 may be a computer program that is configured to be run by the OS 112 to perform one or more coordinated functions, tasks, activities. The registry 116 may correspond to a database containing information usable to boot and/or configure the OS 112, system-wide software settings that control the operation of the OS 112, security databases, and/or user specific configuration settings. The registry 116 may further contain information associated with in-memory volatile data such as, for example, a current hardware state of the OS 112 (e.g., which drivers are currently loaded and in use by the OS 112).

The libraries 118 may include a collection of non-volatile resources that are usable (e.g., callable) by the application 114 and/or other applications (not shown). Example resources include, but are not limited to, pre-written code and/or subroutines, configuration data, and/or classes (e.g., extensible program-code-templates for creating objects of various types). In various implementations, the libraries 118 may enable the application 114 to call upon various system services provided by the OS 112. For example, the libraries 118 may include one or more subsystem Dynamic Link Libraries (DLLs) configured for implementing and/or exposing Application Programming Interface (API) functionalities of the OS 112 to the application 114.

Figure 1B:
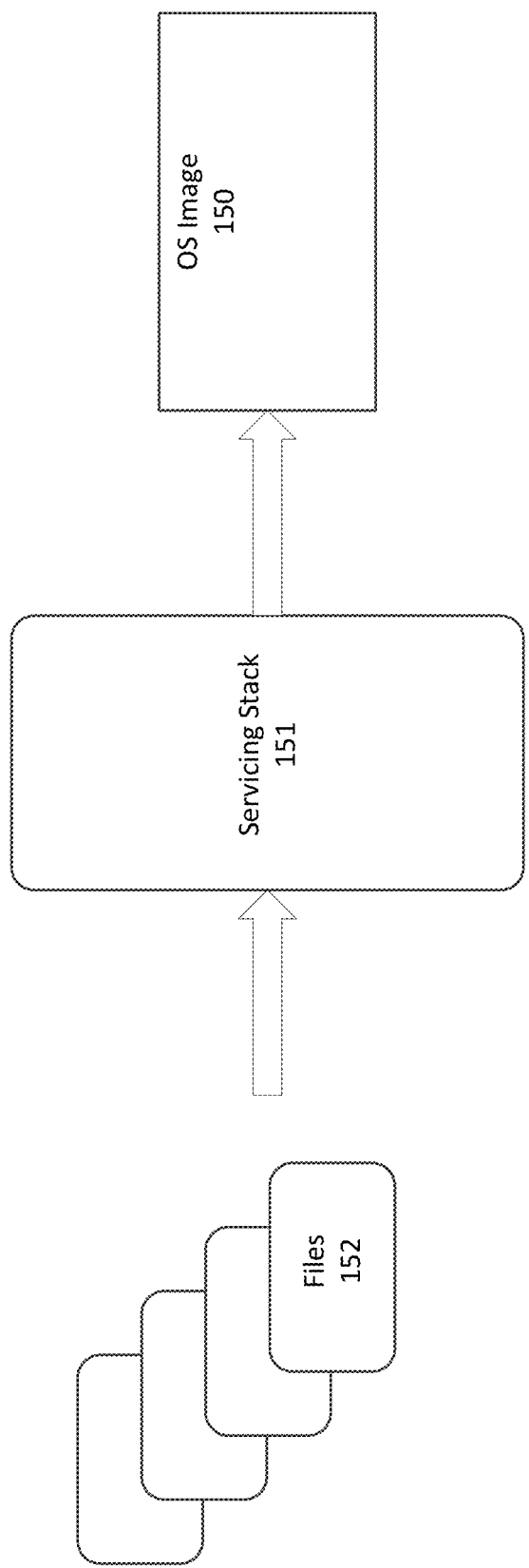
FIG. 1B illustrates an example image build using flat files.

Referring to FIG. 1B, illustrated are a plurality of loose files 152 on disk that may be associated with keys/values in the registry. The files 152 and registry state may be defined as a plurality of components grouped into a plurality of packages. In order to create a new OS image 150, the servicing stack 151 must perform complex and costly processing to translate manifests into raw file and registry operations.

Figure 1C:
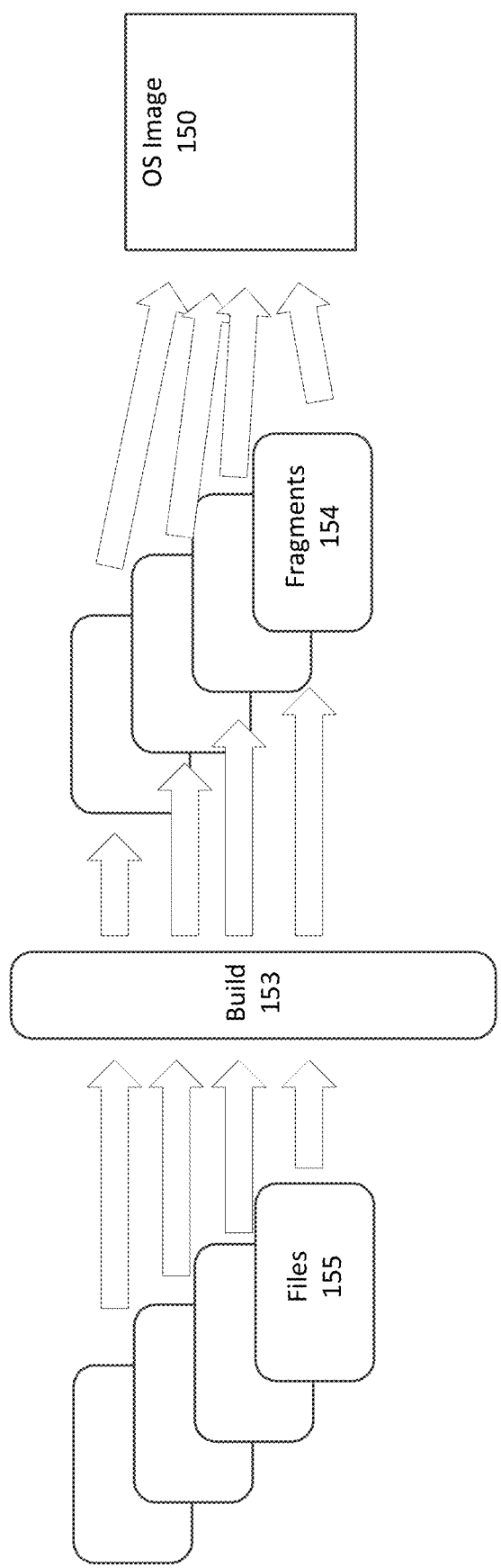
FIG. 1C illustrates an example image build using composite images.

FIG. 1C illustrates an example embodiment in accordance with the present disclosure. An image fragment 154 may be created by front-loading the complex processing described above on a per-package basis by a build process 153, for example in a build lab, and capturing the result in a single archive file. A set of image fragments 154 may be fragments that can be logically merged at runtime into a combined view of a complete OS image 150.

In some embodiments, the updates for a given package may be provided as a signed container. A runtime in-memory merge may be performed for the file system and registry, thereby alleviating the need to persist the merge state. This can improve security and make it easier to select desired packages and thus provide different features (e.g., supplemental functionality, languages, keyboards, etc.).

In an embodiment, a composite image flat file (or composite image file) can be mounted as a read-only volume or container. A merged volume may be composed from multiple different composite image files, which may be referred to herein as image fragments. The multiple composite image files may be merged during boot, exposing a merged file-system and registry.

Providing such a packaged methodology may provide an efficient way to provide state separation, allowing for improvements in update efficiency as well as a way to separate mutable and immutable (e.g., read-only) states without having to resort to loose files. In an embodiment, an image fragment package may be structured as a full system update that is packaged in a single container. In one embodiment, the immutable state may be updated with the merged image in the background, and during reboot the read only states can be swapped. Additionally, the packaging of the fragments enable more efficient running of processes such as compression, which can enable further efficiencies with regard to processing and memory resources.

In an embodiment, a package may be structured into regions that are configured to hold different types and sizes of data such as metadata; smaller data; and larger data region. In an embodiment, at least one region may be sector aligned.

In some embodiments, image fragment packages may have the same priority, avoiding complex merging rules and shadowing. In an embodiment, packages may be selected at runtime without the need for a reboot, as well as the ability to selectively release updates rather that performing a complete system update.

Figure 2:
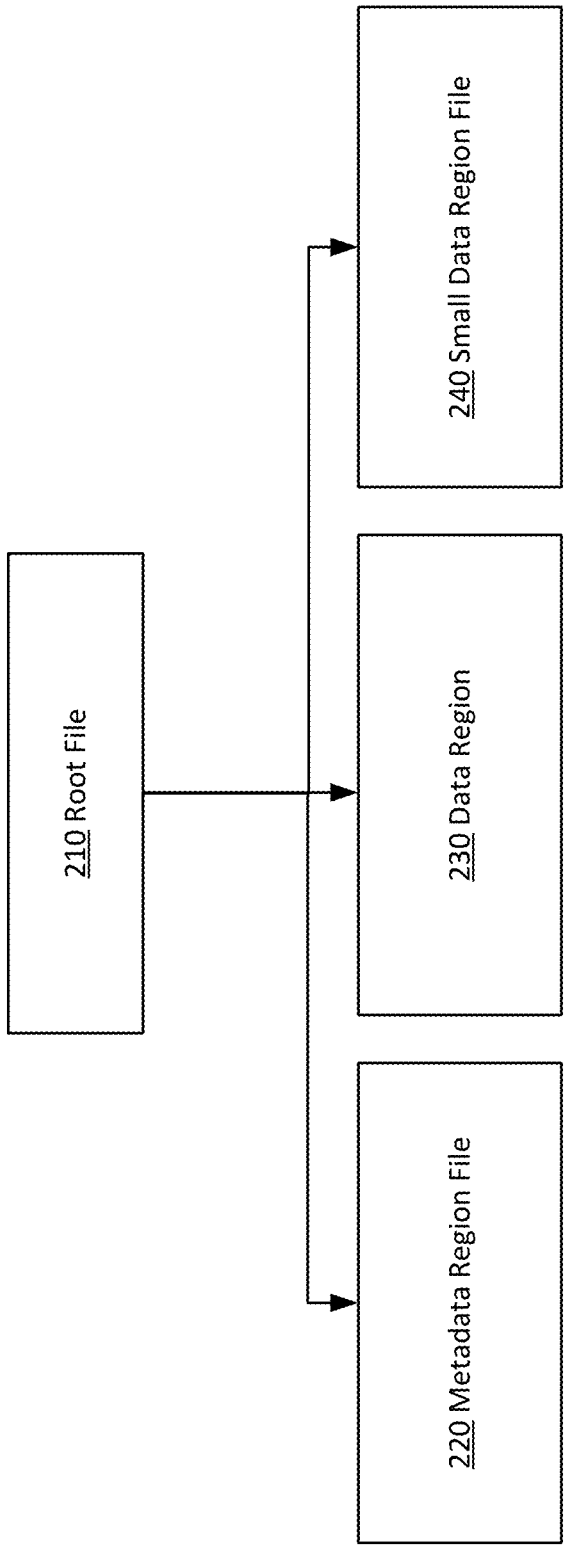
FIG. 2 illustrates an example image layout in one embodiment.

FIG. 2 illustrates an example composite image file layout. Each composite image file may be comprised of multiple different files. A root file 210 may describe region files. In an embodiment, a composite image file may have three types of region files. A metadata region 220 may describe file, directory, and other attributes, security, reparse data, hard links, and the like. The metadata region 220 may also contain file content offset information (e.g., region number and region offset). A data region 230 may have file content that meets or exceeds a predetermined file size, such as 1 Kb. The composite image file may have multiple data regions 230.

A small data region 240 may have file content that is less than 1 Kb file size. The composite image file may have multiple small data regions 240. In an embodiment, the region files may be compressed. In one example, the region files may be Windows Overlay Filter (WOF) compressed.

A data region may align the start of each region to a page size (e.g., 4K) which may provide improved performance. Small data may not be aligned in order to use less space for smaller files.

Conversion of packages into a composite image file may allow for efficient composability across different image types. Images may be placed into existing packaging and imaging flows, for example. A composite image file may be the same between different images, e.g., host, multiple guests, virtual machines.

In an embodiment, as part of the conversion process to an image fragment, a package may be installed to an offline directory and a simplified offline installation may be performed. Processes that are typical of full installations may be reduced or avoided, such as writing of servicing stack metadata.

Multiple composite image files may be merged by constructing a merged filesystem and registry views. In an embodiment, no overlap is allowed so that files and registry values can be efficiently handled.

In some scenarios, security may be computed during merging because of inheritance. Children can inherit from their parent, but their parent security may be defined in a different package. Extra data may be stored in each package to track what directory/key owns the security. The security may be built top-down during the merge.

When booting from a merged composite image file, a database for boot-time configuration data may be used to control the boot volume. The boot-time configuration data may include configuration data to determine what composite images to boot from.

Boot applications (e.g., bootmgr, winload.exe) may be configured to identify a new device type and to read and mount composite image files. Composite image file configuration information may be passed from the boot application to the kernel.

For a non-state separated operating system, running applications need to see a read-write OS volume, but a mounted composite image file volume is read-only. In an embodiment, a read-write volume may be layered on top of the read-only OS volume. Writes may be redirected to the read-write volume. Registry overlays may be used for a similar process for the registry.

The disclosed embodiments provide for a more simple and efficient servicing model. For example, there is no need to compute a set of file/registry operations to apply to the composite image. The new composite image files may be put into place, and the new set of composite image files may be validated as a valid combination, for example, by check signing, checking for overlap, overriding checks, etc.). The updated list of composite image files to boot from may be updated in the boot-time configuration data.

The disclosed embodiments provide may also enable rebootless feature installations and uninstallations. The composite image files may be prepared and validated as for normal updates. The boot-time configuration data configuration may be updated for the list of composite image files to merge. In an embodiment, a service for binding file system namespaces to different locations and hiding remapping from the users may be used to map in new/deleted files into a combined volume. Volatile registry writes may be placed into a read-only OS registry. After reboot, the composite image files may be merged similar to other composite image files, therefore avoiding the need for mapping and reapplying the above operations.

The disclosed embodiments provide improved security as the operating system code is read-only and the composite image files can be signed in the build lab. All metadata and data reads from the composite image files can be verified. The disclosed embodiments also provide improved boot time performance as well as runtime performance post-boot as reads may be faster. Additionally, very little work is required from the servicing stack which results in short downtimes and resets can be performed in near-instant fashion. Finally, the disclosed embodiments can provide greater simplicity and efficiency, for example by allowing for efficient implementation of a single instance between host and guest or across multiple guests. Optionality may be easily supported in containers, and a cleaner rebootless feature update model may be implemented. A simple, converged servicing model may be implemented across multiple editions.

While full volume encryption features (e.g., BitLocker) may be used to protect against offline tampering, the device may have to be rebooted through system initialization and configuration processes. The present disclosure provides for signed composite image files that can prevent tampering, thus avoiding the need to implement full volume encryption for the read-only OS content. The servicing stack only needs to check that the list of the composite image files to merge from are valid, which is very fast and can be an in-memory operation.

Figure 3:
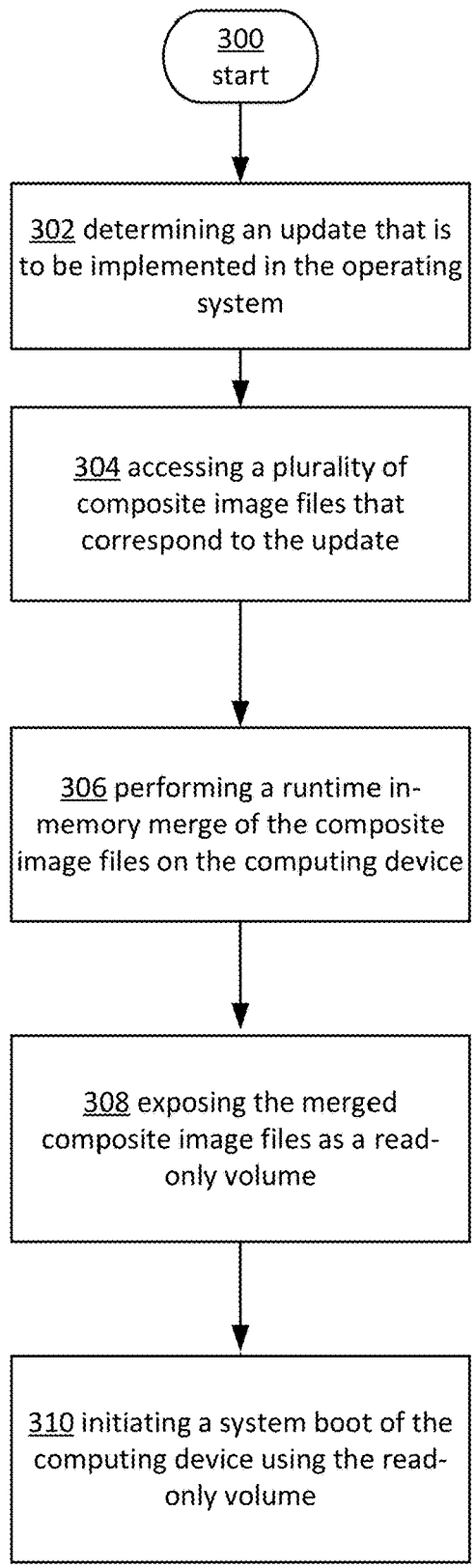
FIG. 3 is a flow diagram of an illustrative process for system updates in accordance with the present disclosure.

Turning now to FIG. 3, illustrated is an example operational procedure for updating an operating system of a computing device, in accordance with the present disclosure. In an embodiment, the example operational procedure may implement a method executing on one or more computing devices. Such an operational procedure may provide for implementing a storage reserve as described herein and as illustrated in FIGS. 1-2.

Referring to FIG. 3, operation 302 illustrates determining an update that is to be implemented in the operating system. Operation 302 may be followed by operation 304. Operation 304 illustrates accessing a plurality of composite image files that correspond to the update. In an embodiment, the composite image files are signed containers containing files for implementing the update to the operating system.

Operation 304 may be followed by operation 306. Operation 306 illustrates performing a runtime in-memory merge of the composite image files on the computing device.

Operation 306 may be followed by operation 308. Operation 308 illustrates exposing the merged composite image files as a read-only volume.

Operation 308 may be followed by operation 310. Operation 310 illustrates initiating a system boot of the computing device using the read-only volume.

Figure 4:
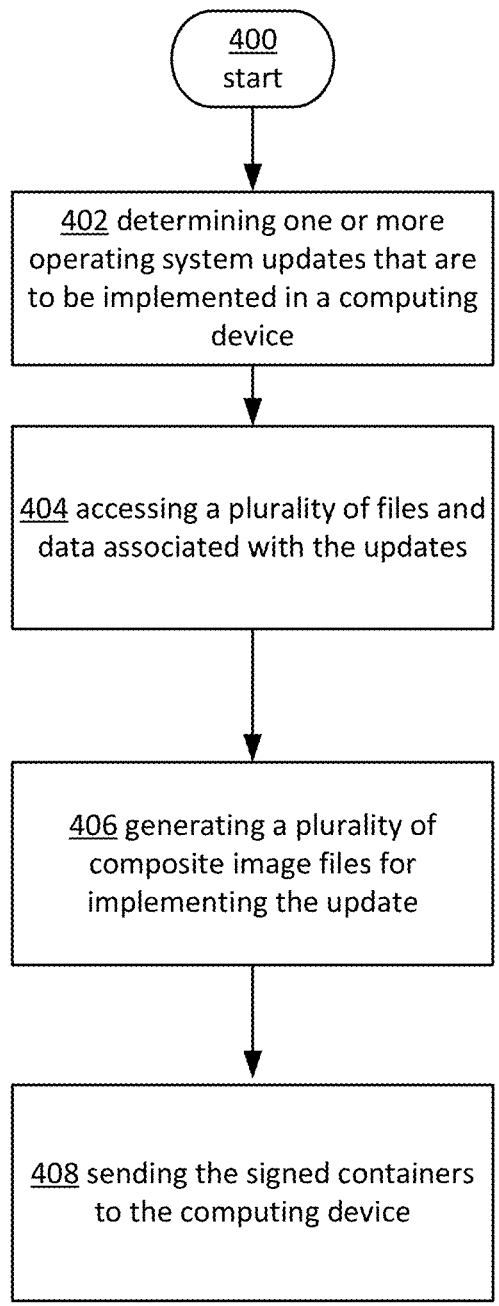
FIG. 4 is a flow diagram of an illustrative process for system updates in accordance with the present disclosure.

Turning now to FIG. 4, illustrated is an example operational procedure for updating a feature of a computing device, in accordance with the present disclosure. In an embodiment, the example operational procedure may implement a method executing on one or more computing devices. Such an operational procedure may provide for implementing a storage reserve as described herein and as illustrated in FIGS. 1-2.

Referring to FIG. 4, operation 402 illustrates determining one or more operating system updates that are to be implemented in a computing device. Operation 402 may be followed by operation 404. Operation 404 illustrates accessing a plurality of files and data associated with the updates.

Operation 404 may be followed by operation 406. Operation 406 illustrates generating a plurality of composite image files for implementing the update. In an embodiment, the composite image files are signed containers that are combinable at the computing device by performing a runtime in-memory merge of the composite image files.

Operation 406 may be followed by operation 408. Operation 408 illustrates sending the signed containers to the computing device.

Figure 5:
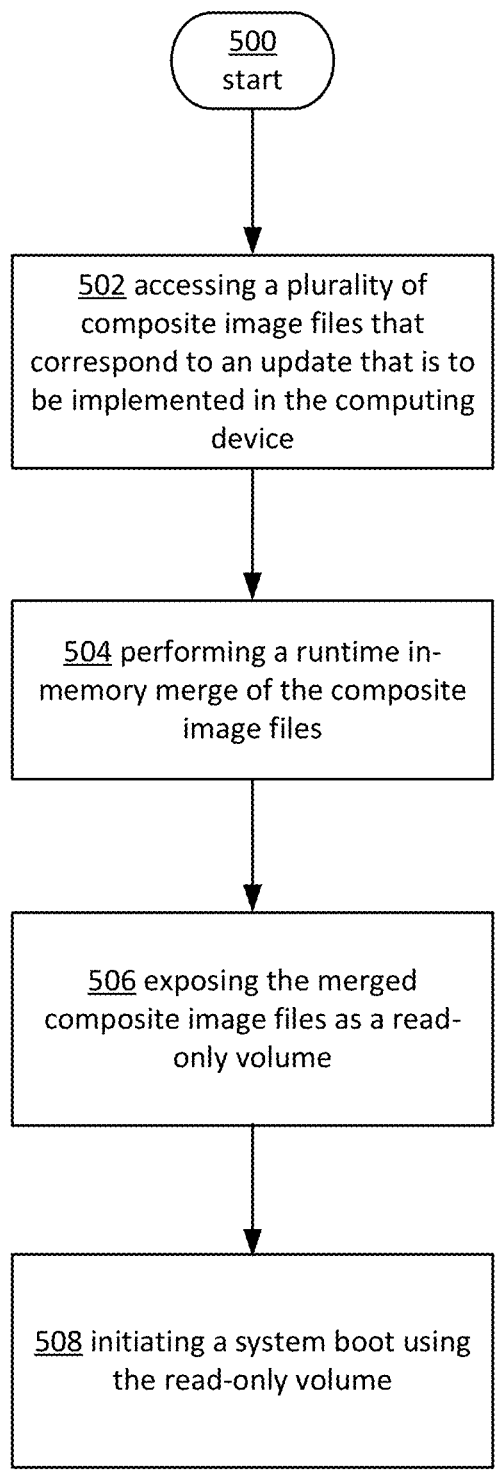
FIG. 5 is a flow diagram of an illustrative process for system updates in accordance with the present disclosure.

Turning now to FIG. 5, illustrated is an example operational procedure for updating a feature of a computing device, in accordance with the present disclosure. In an embodiment, the example operational procedure may implement a method executing on one or more computing devices. Such an operational procedure may provide for implementing a storage reserve as described herein and as illustrated in FIGS. 1-2.

Referring to FIG. 5, operation 502 illustrates accessing one or more composite image files that correspond to one or more updates that are to be implemented in the computing device. In an embodiment, the one or more composite image files are signed containers. Operation 502 may be followed by operation 504. Operation 504 illustrates performing a runtime in-memory merge of the composite image files.

Operation 504 may be followed by operation 506. Operation 506 illustrates exposing the merged composite image files as a read-only volume.

Operation 506 may be followed by operation 508. Operation 508 illustrates initiating a system boot using the read-only volume.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The disclosure presented herein also encompasses the subject matter set forth in the following clauses:

Clause 1.

A computer-implemented method for updating an operating system of a computing device, the method comprising:
  determining an update that is to be implemented in the operating system;
  accessing a plurality of composite image files that correspond to the update, wherein the composite image files are signed containers containing files for implementing the update to the operating system;
  performing a runtime in-memory merge of the composite image files on the computing device;

exposing the merged composite image files as a read-only volume; and initiating a system boot of the computing device using the read-only volume.

Clause 2.

The computer-implemented method of clause 1, wherein the in-memory merge comprises storing modifications to the operating system defined by the composite image files as a read-write layer.

Clause 3.

The computer-implemented method of any of clauses 1 or 2, wherein a layout of the composite image file comprises a root file, a metadata region, and one or more data regions.

Clause 4.

The computer-implemented method of any of clauses 1-3, wherein the one or more data regions include a small data region and a data region.

Clause 5.

The computer-implemented method of any of clauses 1-4, wherein the small data region is for file content that is less than a predetermined size, and the data region is for file content that meets or exceeds the predetermined size.

Clause 6.

The computer-implemented method of any of clauses 1-5, wherein the data region is aligned with a start of each region to a page size.

Clause 7.

The computer-implemented method of any of clauses 1-6, wherein the signed containers include data to track what directory/key owns security for the respective signed container.

Clause 8.

The computer-implemented method of any of clauses 1-7, wherein the composite image files are processed as individual packages prior to delivery to the computing device.

Clause 9.

A system, comprising:
one or more processors;
a memory in communication with the one or more processors, the memory having computer-readable instructions stored thereupon which, when executed by the one or more processors, cause the system to perform operations comprising:
determining one or more operating system updates that are to be implemented in a computing device;
accessing a plurality of files and data associated with the updates;
generating a plurality of composite image files for implementing the update, wherein the composite image files are signed containers that are combinable at the computing device by performing a runtime in-memory merge of the composite image files; and
sending the signed containers to the computing device.

Clause 10.

The system of clause 9, wherein a layout of the composite image file comprises a root file, a metadata region, and one or more data regions.

Clause 11.

The system of any of clauses 9 or 10, wherein the one or more data regions include a small data region and a data region.

Clause 12.

The system of any of clauses 9-11, wherein the one or more data regions include a small data region and a data region.

Clause 13.

The system of any of clauses 9-12, wherein the small data region is for file content that is less than a predetermined size, and the data region is for file content that meets or exceeds the predetermined size.

Clause 14.

The system of any of clauses 9-13, wherein the data region is aligned with a start of each region to a page size.

Clause 15.

The system of any of clauses 9-14, wherein the in-memory merge comprises storing modifications to the operating system defined by the composite image files as a read-write layer.

Clause 16.

A computer-readable medium having encoded thereon computer-executable instructions that, when executed, cause one or more processing units of a computing device to execute a method comprising:
accessing a plurality of composite image files that correspond to an update that is to be implemented in the computing device, wherein the one or more composite image files are signed containers;
performing a runtime in-memory merge of the composite image files;
exposing the merged composite image files as a read-only volume; and
initiating a system boot using the read-only volume.

Clause 17.

The computer-readable medium of clause 16, wherein the in-memory merge comprises storing modifications defined by the composite image files as a read-write layer.

Clause 18.

The computer-readable medium of clauses 16 or 17, wherein the signed containers include data to track what directory/key owns security for the respective signed container.

Clause 19.

The computer-readable medium of any of clauses 16-18, wherein a layout of the composite image file comprises a root file, a metadata region, and one or more data regions.

Clause 20.

The computer-readable medium of any of clauses 16-19, wherein the composite image files are processed as individual packages prior to delivery to the computing device.

The invention claimed is:

1. A computer-implemented method for updating an operating system of a computing device, the method comprising:
determining an update that is to be implemented in the operating system;
accessing a plurality of composite image files that correspond to the update, each of the composite image files comprising an image fragment of a set of image fragments that collectively form a complete operating system image, wherein the composite image files are included in a signed container containing files for implementing the update to the operating system;
merging the image fragments on the computing device; and
initiating a system boot of the computing device using the merged image fragments.

2. The computer-implemented method of claim 1, wherein the merging comprises performing an in-memory merge.

3. The computer-implemented method of claim 1, wherein a layout of the composite image files comprises a root file, a metadata region, and one or more data regions.

4. The computer-implemented method of claim 3, wherein the one or more data regions include a small data region and a data region.

5. The computer-implemented method of claim 4, wherein the small data region is for file content that is less than a predetermined size, and the data region is for file content that meets or exceeds the predetermined size.

6. The computer-implemented method of claim 5, wherein the data region is aligned with a start of each region to a page size.

7. The computer-implemented method of claim 1, wherein the signed container includes data to track what directory or key is associated with security for the signed container.

8. The computer-implemented method of claim 1, wherein the composite image files are processed as individual packages prior to delivery to the computing device.

9. The computer-implemented method of claim 1, further comprising storing modifications to the operating system defined by the composite image files as a read-write layer.

10. The computer-implemented method of claim 1, further comprising exposing the merged image fragments as a read-only volume, wherein the system boot is initiated using the read-only volume.

11. A system comprising:
one or more processors;
a memory in communication with the one or more processors, the memory having computer-readable instructions stored thereupon which, when executed by the one or more processors, cause the system to perform operations comprising:
determining an operating system update that is to be implemented in a computing device;
accessing a plurality of files and data associated with the operating system update;
generating a plurality of image fragments for implementing the operating system update, the image fragments collectively forming a complete operating system image, wherein the image fragments are combinable at the computing device by merging the image fragments; and
sending the plurality of image fragments to the computing device.

12. The system of claim 11, wherein a layout of the plurality of image fragments comprises a root file, a metadata region, and one or more data regions.

13. The system of claim 12, wherein:
the one or more data regions include a small data region and a data region;
the small data region is for file content that is less than a predetermined size;
the data region is for file content that meets or exceeds the predetermined size; and
the data region is aligned with a start of each region to a page size.

14. The system of claim 11, wherein the merging comprises a runtime in-memory merge of the image fragments.

15. The system of claim 11, wherein the image fragments are included in a signed container.

16. A computer-readable medium having encoded thereon computer-executable instructions that, when executed, cause one or more processing units of a computing device to execute operations comprising:
accessing a plurality of image fragments that correspond to an update that is to be implemented in the computing device, the image fragments collectively forming a complete operating system image;
merging the image fragments; and
initiating a system boot using the merged image fragments.

17. The computer-readable medium of claim 16, wherein the merging comprises performing a runtime in-memory merge of the image fragments.

18. The computer-readable medium of claim 16, wherein the plurality of image fragments are included in a signed container.

19. The computer-readable medium of claim 16, wherein the merged image fragments are exposed as a read-only volume, and the system boot is initiated using the read-only volume.

20. The computer-readable medium of claim 16, wherein the image fragments are processed as individual packages prior to delivery to the computing device.

* * * * *